(12) United States Patent
Moyer

(10) Patent No.: US 8,182,617 B2
(45) Date of Patent: May 22, 2012

(54) NITROGEN ALLOYED STAINLESS STEEL AND PROCESS

(76) Inventor: Kenneth A. Moyer, Cinnaminson, NJ (US)

( * ) Notice: Subject to any disclaimer, the term of this patent is extended or adjusted under 35 U.S.C. 154(b) by 0 days.

(21) Appl. No.: 12/951,355

(22) Filed: Nov. 22, 2010

(65) Prior Publication Data

US 2012/0082586 A1 Apr. 5, 2012

Related U.S. Application Data

(60) Provisional application No. 61/389,503, filed on Oct. 4, 2010.

(51) Int. Cl.
*C22C 8/26* (2006.01)
*B22F 3/15* (2006.01)

(52) U.S. Cl. .......................................... 148/230; 419/49

(58) Field of Classification Search .................. 148/230; 419/49
See application file for complete search history.

(56) References Cited

U.S. PATENT DOCUMENTS

| | | | |
|---|---|---|---|
| 5,403,409 A | 4/1995 | Tahara et al. | |
| 5,865,908 A | 2/1999 | Takei et al. | |
| 6,090,223 A | 7/2000 | Kiuchi et al. | |
| 6,395,109 B1 | 5/2002 | Peppler et al. | |
| 6,431,761 B1 | 8/2002 | Yamaguchi et al. | |
| 6,461,448 B1 | 10/2002 | Williams et al. | |
| 6,599,469 B2 | 7/2003 | Ishida et al. | |
| 6,733,600 B2 | 5/2004 | Heishi et al. | |
| 7,186,304 B2 | 3/2007 | Chin et al. | |
| 7,217,327 B2 | 5/2007 | Eiraku et al. | |
| 7,326,306 B2 | 2/2008 | Ishii et al. | |
| 7,431,778 B2 | 10/2008 | Somers et al. | |
| 7,622,009 B2 | 11/2009 | Kuwabara et al. | |
| 7,648,588 B2 | 1/2010 | Hammond et al. | |
| 7,655,100 B2 | 2/2010 | Kuwabara et al. | |
| 2003/0075248 A1 | 4/2003 | Kato et al. | |

OTHER PUBLICATIONS

Campbell and Olson, Systems Design of High Performance Stainless Steel II. Prototype Characterization, Apr. 2, 2000, vol. 7, No. 3, 2001, pp. 171-194, Journal of Computer-Aided.
Bos, Case Hardening of Austenitic Stainless Steel Pump Components, World Pumps, vol. 1998, No. 378, Mar. 1998, pp. 30-34 XP004167884.
Davis et al., ASM Handbook, 1995, ASM International, vol. 4, 33-34, 203, 259-263, 321, 348-351, 363-364 and 714.
Davis et al., Metals Handbook, 1990, ASM International, vol. 1, 841.
Kassim S. Al-Rubaie et al., "Two-Body Abrasion of Nitrocarburised Steels for Hydraulic Cylinders", WEAR, vol. 243, 2000, pp. 112-121.
Case Hardening Stainless Steel Without Disadvantages, Metallurgia, Apr. 1998.
"Kolsterizing . . . A case-hardening process for austenitic stainless steel (for example 316)," cover page, HARDifference, Hardiff BV.
B.H. Kolster, "Development of a Stainless and Wear-Resistant Steel," (Rep.) Materialen, No. 8, Oct. 1987, pp. 1-12.
Brick, Robert M., et al. Structure and Properties of Engineering Materials McGraw Hill Books, 1977 p. 342.

*Primary Examiner* — Jessee R. Roe
(74) *Attorney, Agent, or Firm* — Craig M. Bell

(57) ABSTRACT

The present invention comprises the nitrogen alloying of stainless steel with a gaseous nitrogen compound such as nitrogen gas ($N_2$), or ammonia ($NH_3$) at high temperature wherein the reaction pressure is lowered. A base powder with properties similar to those of a martensitic stainless steel is prepared from a molten metal with the subsequent incorporation of selective additives such as cobalt, chromium, boron, copper, vanadium, niobium and mixtures thereof to improve high temperature resistance to scuffing and adhesive wear. The molten mixture is then atomized by water- or air-atomization to yield a base powder which is mixed with nitrogen or ammonia gas at various pressures in a static or fluidized bed to provide a nitrogen alloyed particulate, i.e., a nitrided particulate alloy. The powder is heated in a hot isostatic press under vacuum with argon gas at reduced pressure and later cooled to ambient temperature.

14 Claims, 5 Drawing Sheets

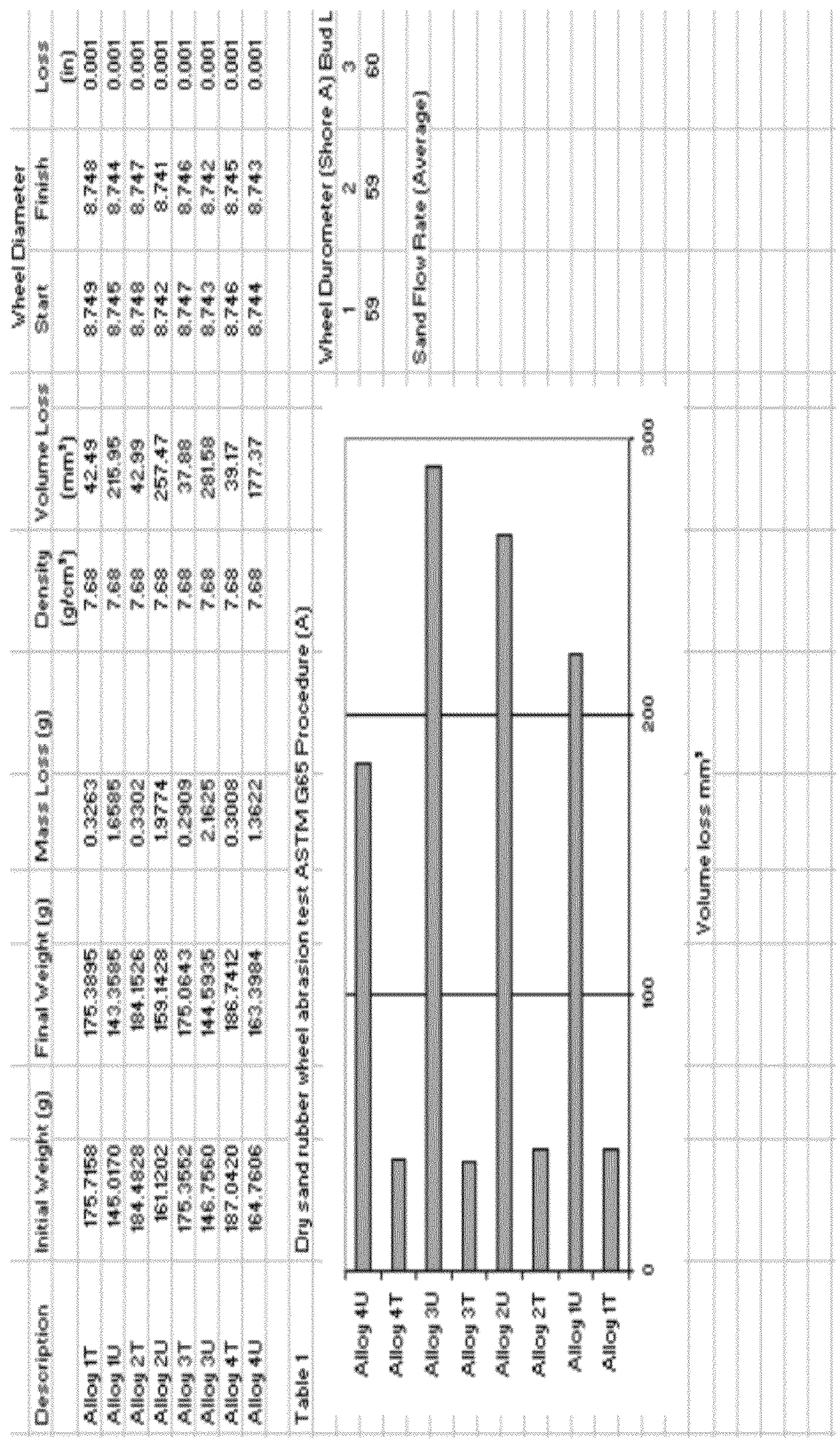

NITROGEN ALLOYED STAINLESS STEEL AND PROCESS

CROSS-REFERENCE TO RELATED APPLICATIONS

This application claims the benefit of priority of U.S. Provisional Appln. No. 61/389,503 filed on Oct. 4, 2010.

This invention was made with United States government support under Naval Air (NAVAIR) Contract No. N88335-190-C-0141.

FIELD OF THE INVENTION

The present invention relates generally to industrial coatings used in the protection of metal surfaces and methods for the application of said coatings onto said metal surface. More specifically, the present invention relates to the hardening of iron-based and stainless steel surfaces for improved wear-resistance and protection thereof against the weather and other external environmental elements.

BACKGROUND OF THE INVENTION

Corrosion protection of high performance steels without sacrificing their mechanical and tribological properties is critical for advanced applications such as defense vehicles and aircraft. Current materials for bearings and gears for example, have insufficient corrosion resistance to satisfy modern Navy requirements, and require corrosion inhibiting oils for corrosion resistance. Although the currently available steels are therefore able to provide corrosion protection, the oil formulations reduce boundary lubrication performance. The reduction in wear resistance, in turn, limits operating power required for improved aero propulsion engine and gear box systems. Advanced bearing steels provide adequate wear resistance, but lack corrosion resistance. High nitrogen martensitic stainless steels have improved corrosion resistance, and also exhibit good contact fatigue resistance. However, these steels are limited in abrasive and adhesive wear resistance and are subject to high speed and high temperature scuffing. The problem is that the protective chromium oxide film limits boundary lubricating film formation. Rather than chromium, iron or iron oxide is required to react with the oil additives. In addition, the high nitrogen martensitic stainless steels do not have the shear stability to resist adhesive wear or scuffing.

Nitriding involves the diffusion of nitrogen into the surface of certain steels to form compounds. In doing so, it expands the steel lattice structure, putting the atomic bonds into tension. This stress makes the surface very hard and also improves the fatigue strength. Fatigue occurs when a cycle of tension followed by compression continues for many cycles. Stressing the lattice structure causes the surface to be in compression, thereby eliminating the tension portion of the fatigue cycle.

In the gas nitriding of stainless steel, the donor is a nitrogen-rich gas such as ammonia ($NH_3$), and is often referred to in the art as ammonia nitriding. When ammonia comes into contact with the heated work piece, it disassociates into nitrogen and hydrogen. The nitrogen concentrated on the surface then diffuses from the surface to the interior, depending upon concentration and time. This aspect of the process is well known in the art. The present invention however, comprises a process that can be accurately controlled. The thickness and phase constitution of the resulting nitriding layers can be selected and the process optimized for the particular stainless steel properties required. The advantages of gas nitriding over the other variants are:

The process results in a homogeneous deposition of nitrogen on the surface.

The preparation of large batch sizes is possible—the limiting factor being furnace size and gas flow With modern computer control of the atmosphere, the nitriding results can be tightly controlled Relatively cheap equipment cost—especially compared with plasma nitriding The disadvantages of the gas nitriding processes known in the art are:

Reaction kinetics are heavily influenced by the stainless steel surface condition. An oily stainless steel surface or one contaminated with cutting fluids will adversely affect the process and result in a poor product.

Surface activation is sometimes required to successfully treat steels with a highly concentrated ammonia as the nitriding medium. Secondly, although not especially toxic, ammonia can be harmful when inhaled in large quantities. Also, care must be taken when heating in the presence of oxygen to reduce the risk of explosion The present invention comprises a nitrogen alloyed stainless steel with a surface treatment that affords superior performance to current martensitic stainless steels. The nitrogen alloyed stainless steels possess improved wear resistance, especially to adhesive wear and scuffing, without the sacrifice of corrosion resistance inherent in martensitic stainless steels. This is achieved through the development of a number of alloys with reduced carbon content to limit sensitization, and through the alloying of the stainless steel alloy with nitrogen. The present invention utilizes a powder metallurgy technology to improve corrosion resistance and enhance adhesion and scuffing resistance. The chromium content is increased to add to the corrosion protection, and copper is added to limit the reaction with the corrosion inhibiting oils. In addition, a nitriding or carburizing cycle was designed to further protect the surface from adhesive wear and to resist scuffing. Thus, the nitrided stainless steel alloys of the present invention have particular applications in the manufacture and assembly of Naval and Air Force aircraft tail hook catch mechanisms.

SUMMARY OF THE INVENTION

The present invention comprises the nitrogen alloying of stainless steel with a gaseous nitrogen compound such as nitrogen gas ($N_2$), or ammonia ($NH_3$) at higher temperatures than practiced today to improve the kinetics of the diffusion process without causing appreciable grain growth. A base powder with chemistry similar to that of martensitic stainless steel is prepared from a molten metal with the subsequent incorporation of selective additives such as cobalt, chromium, boron, copper, vanadium, niobium and mixtures thereof to improve high temperature resistance to scuffing and adhesive wear and corrosion resistance. The molten mixture is then atomized by water- or gas-atomization to yield a base powder which is reacted with nitrogen or ammonia gas at various pressures in a static or fluidized bed to provide a nitrogen alloyed particulate, i.e., a nitrogenated particulate alloy. The powder is heated in a hot isostatic press with pressurized argon gas at elevated temperatures for a specific time and later cooled to ambient (room) temperature to densify the powder. A second embodiment of the invention also comprises the use of a wrought iron-based stainless steel or casting as the starting material to be nitrided or carburized for wear and corrosion resistance.

BRIEF DESCRIPTION OF THE DRAWINGS

FIG. 5 shows profiles demonstrating the wear resistance provided by carburizing the nitrogen alloyed stainless steels.

DETAILED DESCRIPTION OF THE INVENTION

Figure 1:
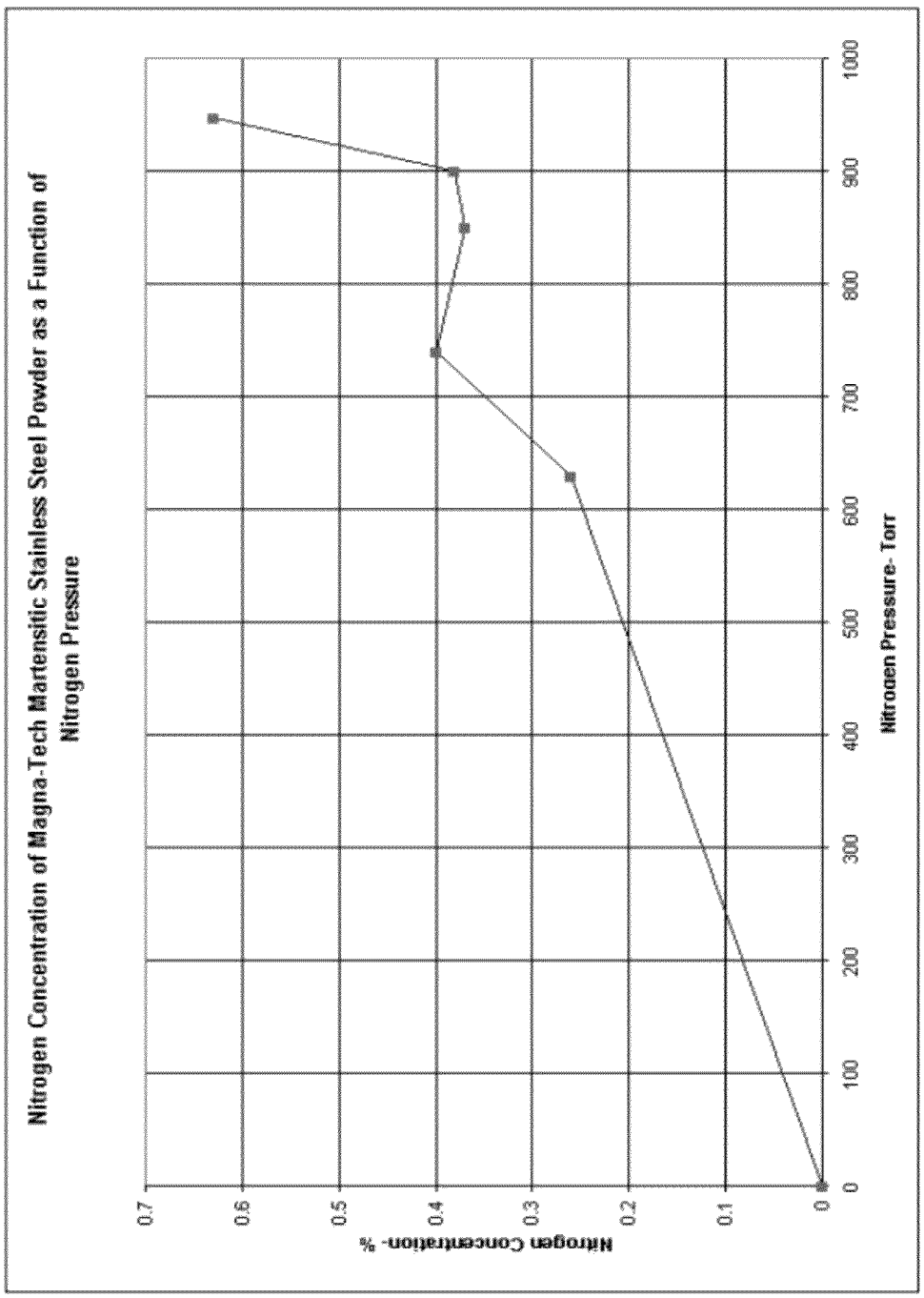
FIG. 1 is a graphic plot of the nitrogen concentration in the stainless steel powder of the present invention as a function of nitrogen pressure.

The present invention comprises the nitrogen alloying of stainless steel with a gaseous nitrogen compound such as nitrogen gas ($N_2$), or ammonia gas ($NH_3$) at high temperature wherein deposition concentration of nitrogen is increased and diffusion is enhanced. A base powder with properties similar to those of a martensitic stainless steel is prepared from molten metal with the subsequent incorporation of selective additives such as cobalt, chromium, boron, copper, vanadium, niobium and mixtures thereof to improve high temperature resistance to scuffing and adhesive wear as well as to improve the corrosion resistance and enhance the steels' resistance to abrasion.

The molten mixture is then atomized by water- or gas-atomization to yield a base powder which is reacted with nitrogen or ammonia gas at various pressures in a static or fluidized bed to provide a particulate nitrogen alloyed powder containing a range of nitrogen concentrations, depending on reaction condition selected. The powder is heated in a hot isostatic press under vacuum and 1,000 psi of argon is injected therein. The temperature of the press is then increased to 1470° F. (800° C.) and the argon gas pressure to 15,000 psi; further increasing the temperature to 1920° F. (1050° C.) for four (4) hours after which the densified powder is cooled to ambient (room) temperature. The mild steel casing encapsulating the densified powder is then removed and the densified nitrogen alloyed powder is placed in a vacuum chamber. The air entrapped in the furnace is then evacuated and replaced with 80 scfh of hydrogen gas. The temperature is then elevated to the temperature selected as the desired reaction temperature. The hydrogen gas is then evacuated from the furnace and replaced with either a carbon or nitrogen gaseous supply at a specific concentration or partial pressure desired to deposit the carbon or nitrogen on the surface of the nitrogen alloyed stainless steel. This supply is then maintained for sufficient time to permit the surface concentration to be maintained while permitting diffusion of the carbon or nitrogen internally from the surface to a specified depth. With sufficient time at the reaction temperature, through hardening of the part is possible.

The carburized or nitrided billets are then immersed into a nitrogen chamber and the temperature lowered to −184° F. (−80° C.) for 30 minutes and then further lowered to −300° F. (−184° C.) and maintained at temperature for 30 minutes to stabilize the microstructure thus formed. The stabilized structure is then aged or tempered to a specific hardness.

The secondary-hardening nitride formation will occur as fine precipitates in the martensite. The degree to which the change will occur will be dependent on:
 The hardness required (after tempering
 The amount of nitride-forming elements present in the steel analysis
 The tempering temperature selected
 The time at the tempering temperature
 The number of tempering procedures given to the steel (generally at least two to three tempers)

The higher the selected final tempering temperature of the steel might be, the coarser the formed nitrides will be.

More specifically, the source of stainless steel powder to be nitrided may be preferably scrap iron as this would provide the least expensive source as well as provide a further means for the "greening" of the planet. As discussed later herein, wrought iron steel may also be "hardened" through the application of the process of the present invention and the preliminary "nitride alloying" incorporation steps may be by-passed. To atomize the powder, the scrap iron is rendered to a molten state through the application of heat at a temperature above the melting point of the alloy to be treated. To the molten base composition, 2 m/o cobalt is alloyed therein to improve high temperature resistance to scuffing and adhesive wear, and 2 m/o copper is added to improve the corrosion resistance, enhance resistance to adhesion and prevent scuffing. In addition, small quantities of niobium and boron are added to further enhance secondary hardening mechanisms. The base powder is then gas- or water-atomized and is free of both carbon and nitrogen.

The nitriding of the powder is accomplished as a result of the reaction of gaseous nitrogen introduced at elevated temperature for significantly less time, depositing and subsequently diffusing into the water or gas atomized particles atomized from the alloying metal elements within the initial molten scrap metal base. These metal additive elements are the nitride-forming elements of chromium, tungsten, molybdenum, vanadium, manganese, titanium, zirconium or niobium.

The second step is to nitride the powder particles. This process was accomplished by introducing nitrogen gas at a temperature of 1900° F. (1040° C.) at various pressures in a static bed one inch high to provide alloys containing 2.5, 4, 5.5 and 8 m/o nitrogen within the individual particles. The nitrogen alloyed powder was then vibrated into mild steel cans and hermetically sealed after evacuation to remove atmosphere from within. The canned powder was placed in a hot isostatic press, which was evacuated and 1,000 psi of argon was introduced. The temperature was elevated to 1470° F. (800° C.) and the argon pressure increased to 15,000 psi. The temperature was then increased to 1920° F. (1050° C.). These conditions were maintained for four (4) hours under the described conditions after which the furnace was cooled to ambient (room) temperature.

The can is removed and optionally the formed billet surface may be further carburized by placing the densified billets into a vacuum furnace and evacuating the furnace to 100μ.

At this point 1.5 cc of a carbon/hydrogen gas mixture was injected into the furnace chamber at a total pressure of 8 torr for five minutes into the furnace. This is commonly referred to as a boost cycle, and it is intended to deposit carbon on the exposed surfaces. At the end of the five-minute boost cycle, the acetylene/hydrogen supply was discontinued and hydrogen at 8 torr pressure remains within the furnace for 55 minutes. This portion of the cycle is commonly referred to as the diffusion cycle. The boost and diffusion cycles in the proportions of time defined were continued for eight hours (8 complete boost and diffusion cycles). At the end of the eight-hour carburizing cycle, the carburized billets were quenched in nitrogen at 10 barr pressure.

It is well known that quench hardening is a process in which steel and cast iron alloys are strengthened and hardened. The material is heated to a certain temperature above the austenite/ferrite transition temperature, depending upon alloy composition, and then rapidly cooled which transforms the austenite to martensite. The material is then tempered to reduce the brittleness inherent in un-tempered martensite that occurs. Items that may be quenched include gears, shafts, and wear blocks.

The next step in the process is quenching of the part. Water is one of the most efficient quenching media wherein maximum hardness is acquired, but there is a chance that it may cause distortion and cracking in highly alloyed steels. In the art, when hardness can be sacrificed, whale, cottonseed and mineral oils are used. These often tend to oxidize and form a sludge, which consequently lowers the efficiency. The quenching velocity (cooling rate) of oil is much less than water. Intermediate rates between water and oil can be obtained with additives to increase the transfer of heat from the surface of the part. To minimize distortion, long cylindrical workpieces are quenched vertically; flat workpieces are quenched on edge; and thick sections should enter the bath first. In order to prevent vapor formation on the surface, the bath is agitated.

Using the process of the present invention, a concentration in the order of 1.8 m/o (mass %) carbon is deposited on the surface of the stainless steel and the use of higher diffusion temperatures provides a greater depth of carburization at reduced times. At this point, the steel is in an un-stabilized condition and there is extensive retained austenite, which would transform to un-tempered martensite. Therefore, the 10 barr quenched billets were immersed into a nitrogen chamber and the temperature was lowered to −184° F. (−80° C.) for 30 minutes and then the temperature was further lowered to −300° F. (−184° C.) and maintained at temperature for 30 minutes to stabilize the microstructure. A final aging treatment in a vacuum furnace at 950° F. (510° C.) for four hours completed the thermal cycle.

The heat treated billets can be sectioned to yield specimens to conduct appropriate tests to determine the potential of the alloys to satisfy the required performance in their application. Core properties can be measured in order to characterize the properties of the base alloy. Since the alloys are produced using powder metallurgy techniques, some porosity could remain after hot isostatic pressing. Therefore, sections of the billets should be measured to determine their density. Archimedes' Principle was used to make these measurements according to ASTM Specification B311 (3). The nitrogen content of the core may also be measured using Leco® Determinators to determine the nitrogen content of the respective alloys. The fracture toughness can be determined according to ASTM Specification E 399 (4). The alloy formed can be immersed in a 5% salt solution to determine the corrosion resistance according to ASTM Specification B895.

Tensile and impact tests complete the analysis of the properties of the nitrogen alloyed martensitic stainless steel alloys.

Another embodiment of the present invention envisions the use of a wrought iron-based steel as the starting material rather than scrap metal, which needs to be transformed in a molten state. In this manner, there is no need to liquefy the starting material to a molten state followed by the incorporation of the selective nitride-forming additives such as cobalt, chromium, boron, etc. The wrought iron-based steel can be heated, gas-surface cleaned and activated directly.

The process is dependent on the two fundamental equations of state. These include Fick's second law: $D=k\sqrt{t}$. This equation defines the carburization depth and is a function of the temperature selected for carburization and the total time for diffusion to result. The total time for diffusion is regulated by multiple boost and diffusion cycles. The second equation of importance is the ratio of the time permitted for the deposition of atomic carbon deposited on the surface to diffuse ($t_d$) to the time allotted for deposition of the atomic carbon on the surface ($t_b$): $R=t_d/t_b$.

After the required number of boost—diffusion cycles to achieve the desired depth of carburization, the alloy is quenched rapidly to provide a martensitic base. The quenched alloy is further stabilized in a nitrogen bath at sub-zero temperatures to transform any retained un-stable austenite present to martensite. The alloy, after stabilization, can be aged or tempered to provide core properties that are typical of the alloy receiving the surface treatment described above. Due to the higher deposition temperatures, shorter diffusion times are possible for the formation of the active carbides, resulting in the ability to obtain either the desired reacted depth of hardness in significantly shorter time, or total alloying which overall results in reduced energy costs and pollution for a greater conservation of the environment.

Without being bound to any theory, it is believed that the atomic nitrogen or carbon is rapidly diffused to combine with mobile nitride or carbide formers inherent within the steel to form primary nitrides, carbides, or other intermetallic compounds. The degree of nitride or carbide formation depends on the diffusion time, partial pressure and temperature as established above. It is believed that during this cycle, the nitride or carbide formers contained within the alloy composition are mobile and also diffuse to result in equilibrium, depending on the available supply of nitrogen or carbon.

The process of the present invention further envisions the use of any nitrogen gas forming composition that may be introduced into a vacuum furnace thereby creating a nitrogen supply or source at partial pressure. This results in the deposition of the concentration of nitrogen atoms on the surface of the active designated alloy that contains nitride formers within, such as, for example, chromium, molybdenum, etc.

The nitrogen source is introduced to the furnace atmosphere as a gaseous mixture at a pre-determined partial pressure for a specific time period to enable the nitrogen to deposit onto the surface and react with nitride formers contained within the alloy, adjacent to the surface, to form nitrides. In a parallel theory, incorporating the nitrogen alloyed powder into a during the diffusion cycle, the nitrogen diffuses from the surface to the interior of the alloy and the alloy nitride formers migrate to the abundant nitrogen supply to react to form stable inter-metallic compounds and martensite.

For example, in the case of a mild steel AISI 1026, seamless tubing with a ½ inch thick wall and therefore ¼ inch was machined from the outside diameter to ensure collapse of the steel during compaction. A steel cap was TIG welded to one end and checked for leaks. The powder was then vibrated into the open end of the respective containers. Once the powder filled the containers, a second end cap was inserted into the cylinder and TIG welded. This end cap contained a small tube in the center, commonly referred to as a suck-down tube. Once the end cap was TIG welded and leak checked, a vacuum pump was attached to the suck-down tube and the air within the container was evacuated until a pressure of 100μ was achieved. The suck-down tube was then heated above the transformation temperature and forged closed to contain the powders under vacuum until consolidated to theoretical density. Again the containers were leak checked to ensure their integrity.

Five containers of powder were loaded into a hot isostatic pressure vessel and the chamber was evacuated to 100μ pressure. The temperature was then elevated to 1470° F. (800° C.) and 1000 psi of argon gas was introduced to the furnace. The temperature was then elevated to 1920° F. (1050° C.) and the argon pressure was increased to 15,000 psi. These compaction conditions were maintained for four hours duration to consolidate the powder and homogenize the microstructure. After four hours the power was discontinued, the argon gas released, and the consolidated billets were permitted to air cool to ambient. Five cans of powder were consolidated to theoretical density. Two were of the 0.25 m/o composition, the remainder having alloys containing 0.4, 0.55 or 0.75 m/o nitrogen. These compositions are identified as alloy 1, 2, 3, and 4.

After removal of the mild steel can encapsulating the densified parts, the densified parts were placed in a vacuum furnace to carburize the surfaces. The system was evacuated to 100μ pressure. Hydrogen gas was introduced at 50 torr pressure and the furnace was heated to 1950° F. (1065° C.). A series of nine boost/diffuse cycles were made at this temperature, where at the beginning of each hour 1.5 cc acetylene gas in hydrogen to a total pressure of 8 torr was introduced into the furnace for five minutes. This is the boost cycle, and it is designed to deposit approximately 1.8 m/o carbon on the surface. After five minutes, the boost cycle is discontinued and hydrogen at 8 torr pressure is maintained for 55 minutes to diffuse the deposited carbon into the surface of the nitrogen martensitic stainless steel. The boost/diffuse cycles were maintained nine times for a total of nine hours. After nine hours of carburization under these conditions, the furnace was provided a 10 barr fast quench to transform the microstructure to martensite. However, to ensure that no retained austenite was present, the quenched billets were placed in a refrigerated system and stabilized first in nitrogen at −112° F. (−75° C.) for 15 minutes and then the temperature is further lowered to −300° F. (−185° C.) for 30 minutes. The four (4) alloys were then aged at 950° F. (510° C.) for four hours in a vacuum furnace.

Another embodiment of the present invention includes a nitriding cycle whereby the nitrogen alloyed steel part that has been densified is maintained in a protective atmosphere, such as hydrogen or argon and elevated to the reaction temperature to produce an active surface. This cleansing gas is then evacuated and nitrogen or derivative gas is introduced to permit a specific concentration of nitrogen upon the surface of the part.

The nitriding process of the present invention can produce a nitrided surface 2 mm deep in less than 10 hours as compared with current nitriding processes that require more than 24 hours to produce a nitrided surface of 1.0 mm. Deposition of nitrogen on the surface is at a higher concentration of greater than 0.1 m/o nitrogen because nitrogen solubility in austenite increases at temperatures greater than 1950° F. (1065° C.). Diffusion of nitrogen deposited on the surface is more rapid because the diffusion rate is faster at higher nitriding temperatures.

Secondly, further diffusion time may be required to homogenize the transition zone where chromium is depleted from an interior strata interfacing with the core martensite. A diffusion couple occurs where chromium and other nitride formers are transported toward the abundant supply of nitrogen at the surface, creating a chromium nitride rich surface that results in exceptional wear resistance and minimal surface corrosion.

The process also comprises a treatment step at sub-zero temperatures to stabilize the martensite by eliminating retained austenite. Once the alloy has been stabilized, the core is then tempered to required hardness, either through tempering or aging to precipitate secondary inter-metallic compounds. The immediate surface is chromium/nitride rich and the amounts and probably the kind of nitrides decrease from the surface strata inward to the core. In contrast, the martensite formation is least at the surface, because the chromium nitride formation predominates.

The following examples are provided to more specifically set forth and define the process of the present invention. It is recognized that changes may be made to the specific parameters and ranges disclosed herein and that there are a number of different ways known in the art to change the disclosed variables. And whereas it is understood that only the preferred embodiments of these elements are disclosed herein as set forth in the specification and drawings, the invention should not be so limited and should be construed in terms of the spirit and scope of the claims that follow herein.

EXAMPLE 1

Three alloy compositions were desired: one containing 0.25 m/o nitrogen, one containing 0.4 m/o nitrogen, and a third containing 5.5 m/o nitrogen. Several runs were made to produce five-pound samples to determine whether the process was successful in providing the proper concentration of nitrogen after nitrogen alloying the powder. Nitrogen content was varied by establishing the nitrogen partial pressure required to yield the desired nitrogen concentration within the powder particles. A one-inch bed of powder was loaded within trays and placed in the vacuum furnace. The furnace was evacuated and the temperature was slowly increased to 1950° F. (1065° C.) in a partial pressure of nitrogen, varied to provide the desired nitrogen concentration within the powder. In each case, the temperature to nitride the water atomized base powder was maintained constant at 1950° F. (1065° C.) and the time to nitride the powder was a constant four hours. Pure nitrogen was used to saturate the powders to the desired chemical composition. Five runs were made to establish the proper nitrogen composition for alloying the water atomized powder.

These data provided the information to permit scale-up of the powder nitriding process to produce 60-pound lots of nitrogen alloyed powder for hot isostatic pressing to densify the powder and for subsequent carburization. The nitrogen concentration within the water atomized powder particles functions exponentially with the nitrogen partial pressure. The study presented no difficulty in calculation of the required pressure to nitrogen alloy the water atomized powder to provide the two lower concentrations of nitrogen. However, three runs were needed to establish the proper nitrogen pressure to produce the nitrogen alloyed powder containing 0.55 m/o nitrogen. The base powder composition prior to nitrogen alloying is presented below as Table 1. The carbon and nitrogen concentration in the water atomized powder particles is shown in Table 2. A graphic representation of particle nitrogen content as a function of the nitrogen pressure is shown in FIG. 1. As can be seen therein, nitrogen content in the steel increases with the application of increased nitrogen partial pressure

TABLE 1

Powder Properties of
Base Stainless Steel Powder Prior to Atomization

Chemical Analysis

| Element | % |
|---|---|
| Carbon | 0.09 |
| Manganese | 0.07 |
| Boron | 0.07 |
| Cobalt | 1.86 |
| Oxygen | 0.21 |
| Chromium | 13.65 |
| Copper | 1.94 |
| Phosphorus | 0.004 |
| Iron | BAL. |
| Nitrogen | 0.02 |
| Molybdenum | 1.53 |
| Sulfur | 0.01 |
| Vanadium | 0.17 |
| Silicon | 0.86 |
| Niobium | 0.2 |

Sieve Analysis

| Mesh U.S. Standard | % Retained |
|---|---|
| 100 | 2.0 |
| 120 | 3.1 |
| 140 | 5.3 |
| 200 | 16.0 |
| 270 | 18.8 |
| 325 | 10.4 |
| −325 | 44.4 |
| Apparent Density-g/cm$^3$ | 2.86 |
| Flow | 29.2 sec/50 g |

TABLE 2

Compound Formers in Nitrogen Alloyed Stainless Steels

| Alloy | Nitrogen | Oxygen |
|---|---|---|
| 1 | 0.26 | 0.22 |
| 2 | 0.34 | 0.20 |
| 3 | 0.50 | 0.21 |
| 4 | 0.66 | 0.22 |
| Powder | 0.02 | 0.21 |

Figure 2:
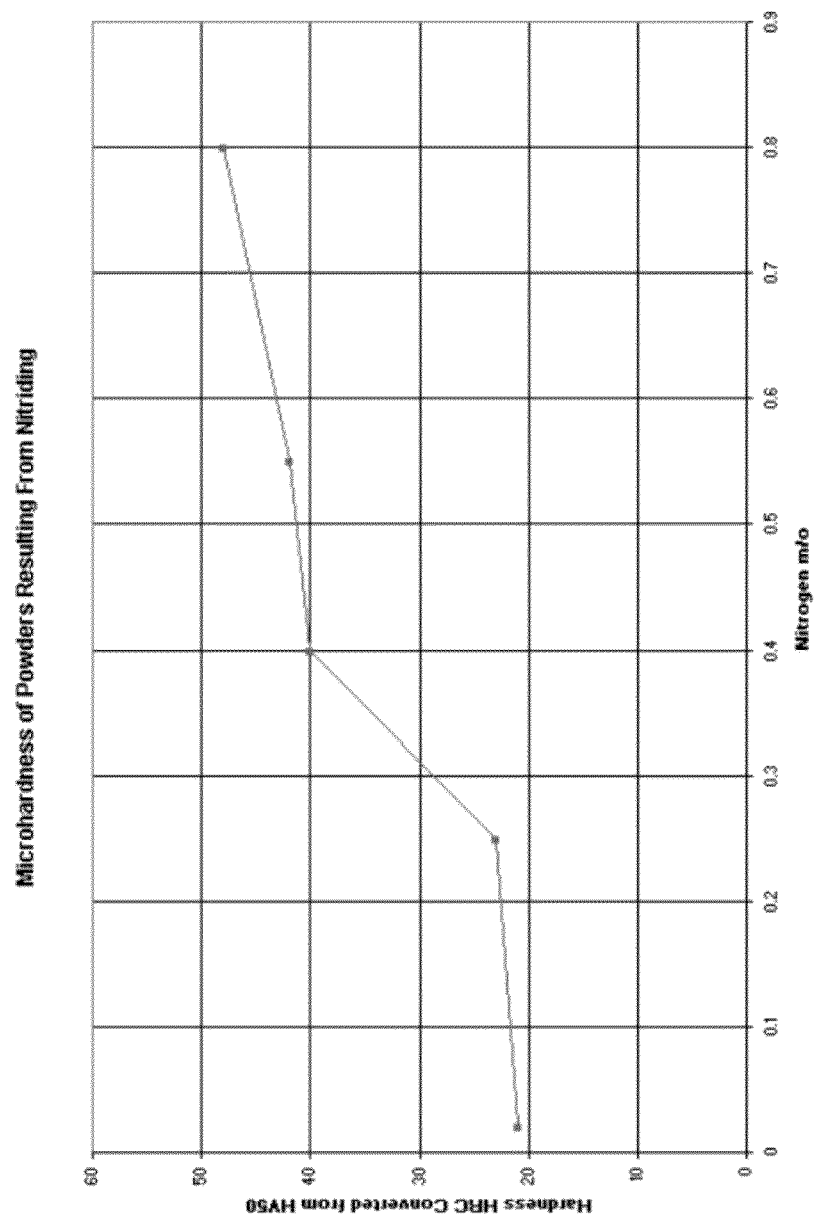
FIG. 2 is a graphic plot showing the increase that occurs in the micro-hardness of the alloyed particles of the present invention as a function of the nitrogen content of the particles.
Figure 3:
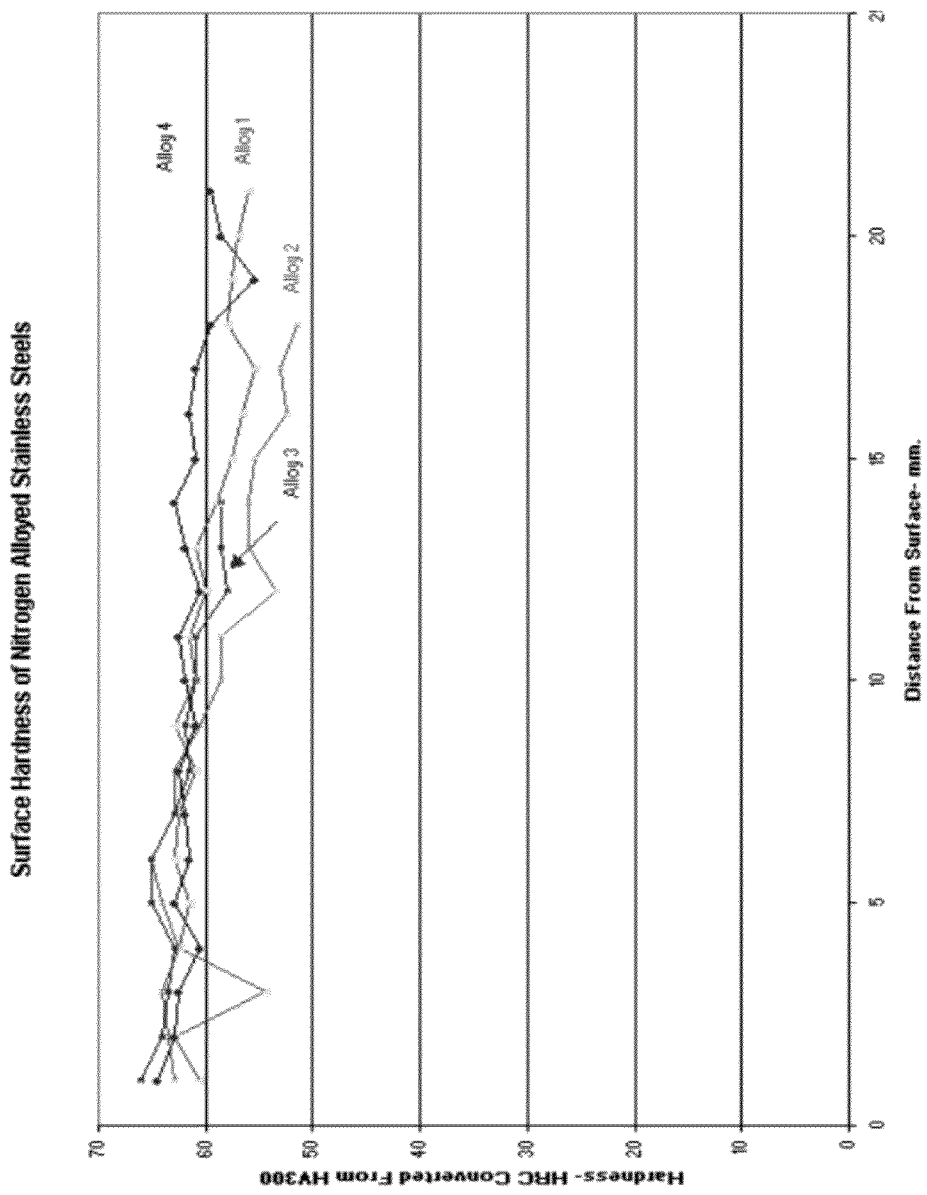
FIG. 3 shows surface hardness depth profiles of the nitrogen content of nitrogen alloyed stainless steel.
Figure 4:
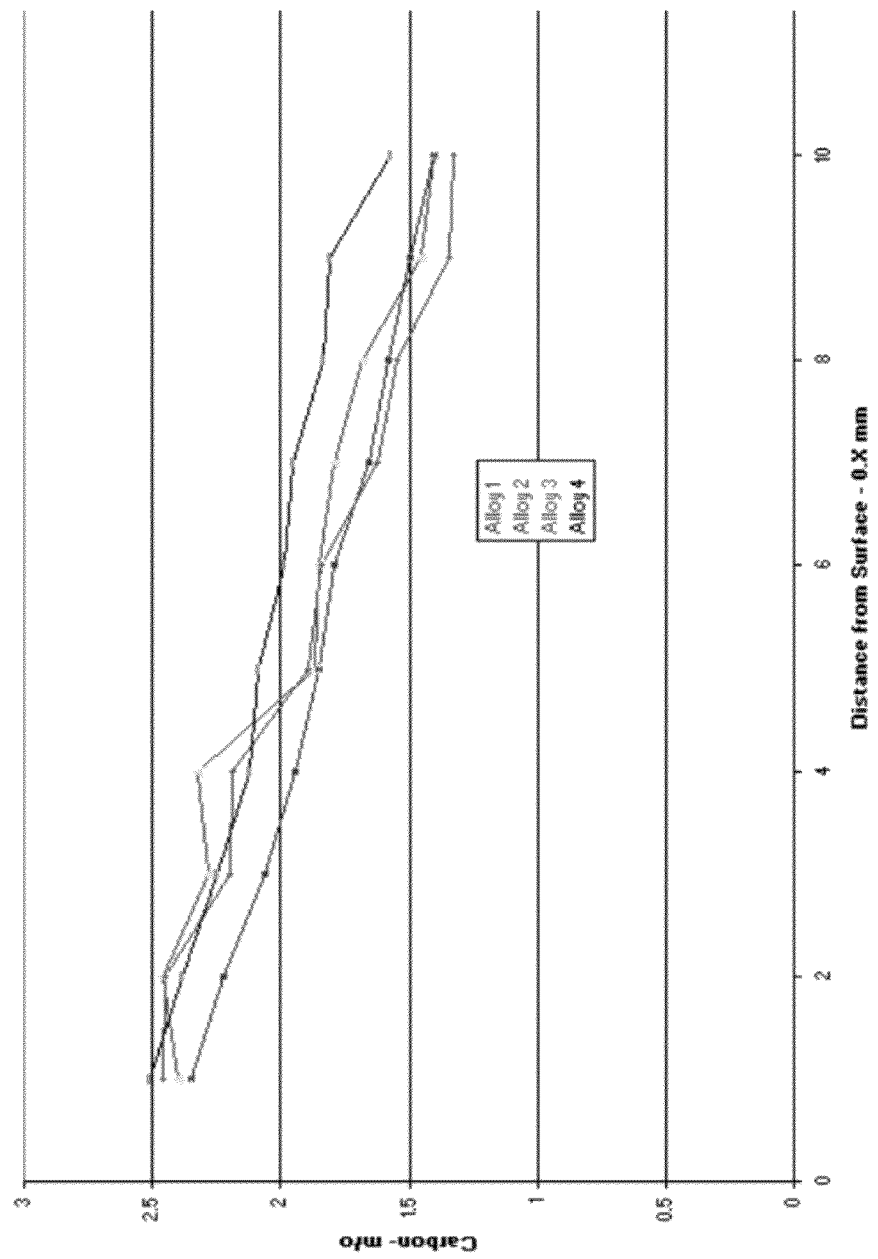
FIG. 4 shows the diffusion of carbon into the surface of the nitrided steel after carburizing.

FIG. 2 is a graph showing the degree of hardness of the nitrogen alloyed powder, which increases as the amount of nitrogen alloyed with the base powder increases. The microstructure consists of fine martensite, with the white regions consisting of hard chromium nitrides. This kind of microstructure would provide a hardened material throughout.

By nitriding or carburizing the surface a wear test indicates that the resistance to wear caused by abrasion of sand on the surface under load with a rotating hard rubber wheel for 2000 rotations of the wheel (Falex test) results in 80% improvement regarding abrasive wear as shown in FIG. 5. Although the surface appears to be rusted within 24 hours, the condition appears to be mostly visual, with no evidence of pitting and less than 0.1 m/o weight loss in 200 hours. The nitriding process of the present invention improves wear resistance, with minimal corrosion and equivalent core properties at lower cost, less total heat treatment time, lower energy consumption and is friendlier to the environment.

EXAMPLE 2

Bushings of 422 stainless steel composition were placed in a partial pressure vacuum furnace and evacuated to −100μ pressure. Hydrogen gas was introduced and the temperature was elevated to 1000° F. (540° C.) to activate the surface. The atmosphere was shifted to a partial pressure of nitrogen gas and the temperature was elevated to 2000° F. (1095° C.). The nitrogen gas flow was increased to 630 torr and the bushings were nitrided under these conditions for a total of 10 hours. The bushings were quenched in nitrogen at 10 barr pressure to ambient in approximately 53 seconds. The quenched bushings were stabilized in liquid nitrogen at −300° F. for 30 minutes and tempered in air for 2 hours.

One machined bushing nitrided under the above conditions was sacrificed to permit micro-hardness readings at the surface for a depth of 1 mm. at 0.1 mm intervals. Subsequent hardness measurements were continued to measure the hardness over the total cross section. To accomplish this, the cross section was mounted in Bakelite, ground and polished. A load of 1 kg force was employed to make the required indentations for measurement. Prior to testing, a standard test block was tested to determine the bias of the test method. Traverses were made throughout the total cross section of the bushings.

Small cubes were also cut from the nitrided bushing and analyzed for nitrogen content, using Leco® determinators. Again, standard test specimens are evaluated to determine the bias of the test measurements.

The results of the evaluation are set forth in Table 3. Traverses of the surface were made on the cross section of the nitrided bushing. The hardness measurements indicate that a minimum nitrided surface of 58 HRC for a distance of 1 mm. has been achieved. The total cross section had a minimum hardness of 55 HRC.

TABLE 3

Hardness of Nitrided 422 Stainless
Steel Resulting from 2000° F. Cycle

| Distance from Surface (mm). | Hardness(HRC) |
|---|---|
| 0 | 54.5 |
| 0.1 | 60.5 |
| 0.2 | 62 |
| 0.3 | 61 |
| 0.4 | 60.5 |
| 0.5 | 60.5 |
| 0.6 | 60 |
| 0.7 | 59.5 |
| 0.8 | 59.5 |
| 0.9 | 59 |
| 1.0 | 59.5 |
| 1.1 | 58.5 |
| 1.2 | 58 |
| 1.3 | 59 |
| 1.4 | 59.5 |
| 1.5 | 58.5 |
| 1.6 | 58 |
| 1.7 | 59 |
| 1.8 | 58.5 |
| 1.9 | 57.5 |
| 2.0 | 57 |
| 2.5 | 57 |
| 3.0 | 56.5 |
| 3.5 | 57 |
| 4.0 | 58 |
| 4.5 | 57.5 |
| 5.0 | 57.5 |
| 5.5 | 56.5 |
| 6.0 | 56 |
| 6.5 | 57.5 |
| 7.0 | 56 |
| 7.5 | 57 |
| 8.0 | 55.5 |
| 8.5 | 56 |
| 9.0 | 56.5 |
| 9.5 | 55.5 |

TABLE 3-continued

Hardness of Nitrided 422 Stainless
Steel Resulting from 2000° F. Cycle

| Distance from Surface (mm). | Hardness(HRC) |
|---|---|
| 10.0 | 56.5 |
| 10.5 | 57 |
| 11.0 | 55.5 |
| 11.5 | 57 |
| 12.5 | 56 |
| 13.5 | 57.5 |
| 14.0 | 58.5 |
| (Inside Diameter) | 54 |

The microstructure of a bushing that was nitrided at 2000° F. (1095° C.) for ten (10) additional hours indicates that it consists of tempered martensite with no evidence of retained austenite being present. As can be seen from the data graphically set forth in FIG. 2, the concentration of nitrogen used to nitride the steel is directly correlated to the amount of nitrogen absorbed into the steel during the process of the present invention.

The nitrogen content was measured and was found to be 0.14%. Therefore, not only does the process of the present invention produce a nitrided surface, but if the stainless steel component is subjected to extreme degrees of wear, corrosion and/or stress, whereby through hardening is needed, the present process can through harden a ⅝ inch cross section.

EXAMPLE 3

Spray paint pumps distribute sprayed paint under an atomizing pressure of 3,000 psi. One of the main constituents of the pump is the piston rod. In practice, the piston rod is protected from erosion by seals that prevent hard abrasive particles comprising the pigments from abrading the piston rod. However, when sustaining service, the seals begin to leak and thereby permit pigment to abrade the piston rod. Therefore the piston rod requires some degree of surface protection against abrasion, while not compromising the corrosion resistance of the piston rod.

There are various types of alloys that can provide the abrasion resistance for protection of the surface of the piston rod. The two alloys selected for this study were a precipitation hardening stainless steel and a 440 A stainless steel. The precipitation hardening stainless steel of choice is of 17-5 PH chemical composition. This material has the properties of good strength, ductility and toughness required of piston rods. In addition, the alloy provides excellent corrosion resistance against the vehicle of the paint being transported to the nozzle.

The other material of choice is a 440 A martensitic stainless steel. When tempered, this steel has strength, ductility and toughness equivalent to the precipitation hardened 17-5 PH stainless steel. However, it is not as protective against corrosion by the paint vehicle, and also requires a hard, wear resistant surface, as applied by nitriding or carburizing. The process of the present invention was utilized to provide hardness and wear resistance to the two respective alloys.

Six (6) machined piston rods were obtained in order to provide a surface hardness of 60 HRC for a depth of 0.030 inch (1 mm). Three (3) of the piston rods had been machined from 440 A martensitic stainless steel. The remaining three (3) piston rods had been machined from 17-5 PH stainless steel. The threads of one piston rod of each composition were to be masked to prevent nitriding from occurring. The remaining piston rods had no protection applied to prevent nitriding from occurring.

The six piston rods were placed in a vacuum furnace and hung vertically in the middle from wires so that all surfaces were available for the deposition of gaseous nitrogen on the surface of the piston rods. The furnace was evacuated and 50 scfh. hydrogen was introduced to the furnace. At a temperature of 1000° F. (540° C.) the hydrogen was removed from the furnace and nitrogen at 630 torr was introduced. The temperature was elevated to 1900° F. (1040° C.) and maintained for a total of eight hours. The piston rods were then quenched at a nitrogen pressure of 10 barr.

The six piston rods were transferred to a nitrogen bath where they were stabilized in a liquid nitrogen temperature of −300° F. (−184° C.) for 30 minutes. The three 17-5 PH piston rods were transferred to an air furnace and aged at 900° F. (480° C.) for one hour. The three 440 A piston rods were transferred to an air furnace and tempered at 400° F. (204° C.) in air for one hour.

One piston rod of each composition with the threads masked, and one piston rod without the threads masked were evaluated. One piston rod of each composition without the threads masked was retained to determine the micro-hardness and depth of the nitrided surfaces and to determine the effect of the heat treatment on corrosion resistance of the piston rods.

To determine the hardness and depth of hardness from the surface, the piston rods were sectioned to obtain small segments of cross section at the reduced end, one inch from the reduced end, one inch from the threaded end and from the threaded end. These sections were mounted in Lucite, ground and polished. The polished cross sections were placed on the stage of a Leco micro-hardness tester in sequence. Prior to placement, a standard hardness specimen was evaluated and the hardness measurements were found to be precise within ±0.5 HRC. Micro-hardness measurements of each cross-section were then made at the surface at 0.1 mm increments internally to the core.

After the hardness was determined, the 17-5 PH cross sections were etched with Ralph's reagent to reveal the microstructure. The 440 A martensitic stainless steel cross sections were etched with Vilella's reagent to reveal their microstructure. Remaining cross sections of the 17-5 PH and 440 A martensitic stainless steel piston rods were immersed in a 5% saline solution. After immersion for 200 hours their weight loss or weight gain was measured to determine the extent of corrosion that resulted from the heat treatment.

The alloy surfaces were nitrided to provide a hardness of 60 HRC for a depth of 0.030 inch (1 mm). In the case of the 17-5 PH stainless steel, this hardness did not occur because the nitrogen is deposited on the surface and then migrates inward via diffusion. Once the material is fast quenched, the nitrogen remains trapped in the material. Upon stabilization at subzero temperatures and subsequent aging, the nitrogen forms small nitrides within an austenitic matrix. Austenite is a more open microstructure. The nitrogen stresses the lattice structure, but not more than that resulting from the aging treatment. Therefore there was no additional contribution to surface hardness through nitriding because the aging created precipitates that were more effective in hardening the total structure. Nitriding will therefore not make a contribution to the surface hardness to provide more wear resistance for the piston rod surface.

The hardness of the 440 A stainless steel surface to a depth of 1 mm is included as Table 4. In this Table, the hardness of the core is measured as 44 HRC. However, unlike the 17-5 PH stainless steel, the 440 A stainless steel has a

TABLE 4

Nitriding of 440A Stainless Steel Rods

| Distance from Surface-mm | Short End | 1" From Short End | 1" From Threaded End | Threaded End |
|---|---|---|---|---|
| Surface | 59 | 62.5 | 60 | 58.5 |
| 0.1 | 60.5 | 63 | 58.5 | 56 |
| 0.2 | 60 | 63.5 | 57.5 | 57 |
| 0.3 | 63 | 64.5 | 57.5 | 59 |
| 0.4 | 61.5 | 63.5 | 59 | 59 |
| 0.5 | 61.5 | 64 | 58 | 59 |
| 0.6 | 61.5 | 61.5 | 58 | 60 |
| 0.7 | 61 | 62.5 | 60.5 | 60 |
| 0.8 | 61.5 | 64 | 59.5 | 63 |
| 0.9 | 60.5 | 63.5 | 58.5 | 61 |
| 1.0 | 60.5 | 64 | 59 | 63 |
| 1.1 | 60.5 | 63 | | |
| 1.2 | 60 | 62.5 | | |
| 1.3 | 59.5 | 62 | | |
| 1.4 | | 62.5 | | |
| 1.5 | | 61 | 60 | 60 |
| 1.6 | | 63.5 | | |
| 1.7 | | 62.5 | | |
| 1.8 | | 61 | | |
| 1.9 | | 61.5 | | |
| 2.0 | | 62 | 61 | 58.5 |
| 2.5 | | 62 | 62 | 58.5 |
| 3.0 | | 62.5 | 61.5 | 61.5 |
| 3.5 | | 63 | 60.5 (ID) | 55 (ID) |
| 4.0 | | 63 | | |
| 4.5 | | 63 | | |
| 5.0 | | 63.5 | | |
| core | 58.5 | 63 | | | martensitic structure and therefore the surface hardness increased to 60 HRC.

The microstructure of the nitrided 17-5 PH stainless steel indicates no nitride formation on the surface, but rather an austenitic matrix with possibly some nitride formation in the grain boundaries. The nitrides formed were not sufficient to improve the hardness and strength that resulted from precipitation of fine inter-metallic particles during the aging treatment. Corrosion resistance of the 17-5 PH stainless steel that was obtained from the nitriding, stabilization and aging treatment was not affected. A slight weight gain of 0.0003 grams resulted after immersion in a saline solution for 200 hours. In contrast, the 440 A stainless steel behaved better than expected. A period of eight (8) hours was provided to nitride the surface to a hardness of 60 HRC for a depth of 0.040 inch (1 mm). However, as shown in Table IV, the piston rod was through hardened to a hardness of 60 HRC under these conditions.

As shown by the data of the three examples discussed above, what is described shows the diversity of the totality of the invention. First, a system using powder metallurgy processing is described whereby a powder of a base alloy is either water or gas atomized. This powder is then nitrogen alloyed to include nitrogen as a major alloying element in concentrations ranging to 8 m/o to provide a core microstructure harder than commercial stainless steels. It also produces a family of alloys that is less susceptible to corrosion than conventional martensitic stainless steels.

Once the powder is consolidated to full density, the part, produced to final dimensions, may be either carburized or nitrided to provide a hard, wear resistant surface with little or no sacrifice of corrosion resistance. A further extension of the time used to carburize or nitride the surface may permit through hardening of the part to a uniform hardness as high as 60 HRC, if so desired.

Although the materials discussed in this invention are limited to consolidated nitrogen alloyed stainless steel powder, 422 and 430 A martensitic stainless steel alloys, the limitation is not meant to exclude other alloys that contain significant concentrations of carbide or nitrogen formers. This group of alloys include austenitic and duplex stainless steels, tool steels and low alloy steels. Either carburizing or nitriding successfully applies a surface of desired depth of hardness in less than half the time of commercial processes practiced today, in a clean environment for the workers, and without discharge of toxic gases to the atmosphere.

What is claimed is:

1. A process for nitriding stainless steel comprising:
 a) forming an alloy of martensitic stainless steel from scrap or other ferrous metal through the application of high temperature to liquefy the scrap or ferrous metal to a molten liquid;
 b) incorporating metal additives to form a molten mixture;
 c) subjecting said molten mixture to water- or gas-atomization to yield a particulate base alloy powder;
 d) introducing hydrogen or argon gas in order to clean the surface of the powder prior to activation with nitrogen;
 e) removing the hydrogen or argon gas from the furnace;
 f) introducing nitrogen or ammonia gas at a partial pressure of from about 500 torr to about 1000 torr in a static or fluidized bed to nitrogen alloy the particulate base powder;
 g) quenching the nitrogen alloyed particulate base powder;
 h) heating the nitrogen alloyed powder in a hot iso-static press under vacuum at reduced pressure followed by the injection of argon gas at 1,000 psi;
 i) increasing the temperature to 1470° F. (800° C.) and the argon pressure to 15,000 psi;
 j) further increasing the temperature to 1920° F. (1050° C.) for four hours after which the consolidated particulate alloy powder is cooled to ambient temperature.

2. The process as recited in claim 1 further comprising an additional carburization treatment of the stainless steel surface through the secondary application of heat in combination with acetylene or methylene gas.

3. The process of claim 1 wherein said additives are selected from the group consisting of cobalt, chromium, boron, copper, vanadium, niobium and mixtures thereof.

4. The process of claim 3 wherein the particulate alloy formed contains said nitrogen within the individual particles.

5. The process of claim 4 wherein the incorporation of said additives creates a base powder with enhanced corrosion resistance, wear resistance and high temperature resistance.

6. The process of claim 5 whereby the nitrided stainless steel powder is maintained in the hot iso-static press in order to densify the powder into a solid.

7. The process of claim 6 wherein said nitrogen alloyed and densified steel is maintained in a vacuum furnace in the presence of hydrogen or argon gas in order to clean the surface thereof.

8. The process of claim 7 further comprising a second nitriding step after the stainless steel is cooled to ambient temperature consisting of:
 a) increasing the temperature to 1470° F. (800° C.) and the furnace pressure to 15,000 psi;
 b) adding argon or hydrogen gas for a time sufficient to clean the surface of said stainless steel;
 c) removing the hydrogen or argon gas from the furnace;

d) introducing nitrogen or ammonia gas at a partial pressure of from about 500 torr to about 1000 torr;
e) maintaining said increased temperature, and
f) quenching and cooling the stainless steel.

9. The process as recited in claim 8 wherein said steel is hardened throughout.

10. The process as recited in claim 8 wherein said steel is furthered hardened on its surface.

11. The process as recited in claim 8 wherein prior to cooling the final product the temperature is raised to from about 900° F. (480° C.) to about 2500° F. (1370° C.).

12. The process as recited in claim 11 wherein said steel surface is further nitrided or carburized at a temperature of from about 1400° F. (760° C.) to about 2200° F. (1205° C.).

13. The process as recited in claim 12 wherein the quenched nitrided steel alloy is further stabilized in a nitrogen bath at sub-zero temperatures to ensure any remaining austenite is transformed into un-tempered martensite.

14. The process as recited in claim 13 wherein the stabilized nitrided steel is tempered to a specific core hardness.

* * * * *

UNITED STATES PATENT AND TRADEMARK OFFICE
CERTIFICATE OF CORRECTION

Page 1 of 1

PATENT NO. : 8,182,617 B2
APPLICATION NO. : 12/951355
DATED : May 22, 2012
INVENTOR(S) : Kenneth A. Moyer It is certified that error appears in the above-identified patent and that said Letters Patent is hereby corrected as shown below:

In the Specification

In column 1, lines 9 - 10 under the heading Cross - Reference to Related Applications, Naval Air (NAVAIR) Contract No. N88335 - 190-C - 0141 should be corrected to N68335 - 10 - C - 0141.

Signed and Sealed this
Sixteenth Day of December, 2014

Michelle K. Lee
*Deputy Director of the United States Patent and Trademark Office*